(12) United States Patent
Begin

(10) Patent No.: US 6,729,176 B2
(45) Date of Patent: May 4, 2004

(54) CALIBRATION OF ORTHOGONAL SENSOR SUITE

(75) Inventor: John D. Begin, Sterling Heights, MI (US)

(73) Assignee: Magellan DIS, Inc., Rochester Hills, MI (US)

(*) Notice: Subject to any disclaimer, the term of this patent is extended or adjusted under 35 U.S.C. 154(b) by 73 days.

(21) Appl. No.: 09/824,543

(22) Filed: Apr. 2, 2001

(65) Prior Publication Data

US 2002/0100310 A1 Aug. 1, 2002

Related U.S. Application Data

(60) Provisional application No. 60/193,637, filed on Mar. 31, 2000.

(51) Int. Cl.$^7$ ............................................. G05B 19/42
(52) U.S. Cl. .................................................. 73/1.38
(58) Field of Search ............................ 73/1.38; 702/96

(56) References Cited

U.S. PATENT DOCUMENTS

| 3,597,598 A | 8/1971 | McAllister |
|---|---|---|
| 3,803,387 A | 4/1974 | Lackowski |
| 3,924,824 A | 12/1975 | Brodie et al. |
| 4,038,527 A | 7/1977 | Brodie et al. |
| 4,303,978 A | 12/1981 | Shaw et al. |
| 5,161,311 A | 11/1992 | Esmer et al. |
| 5,834,623 A | 11/1998 | Ignagni |
| 6,018,317 A | 1/2000 | Dogan et al. |

FOREIGN PATENT DOCUMENTS

SU    001540494    * 7/1992 ................. 73/1.38

* cited by examiner

Primary Examiner—Robert Raevis
(74) Attorney, Agent, or Firm—Lowe Hauptman Gilman & Berner, LLP

(57) ABSTRACT

A method for calibrating an orthogonal sensor suite includes the steps of imparting on the sensor suite a series of known accelerations at orientations known relative to each other, while recording readings from the sensors from each acceleration at each orientation. This data is used to create a transformation matrix which removes offsets from each sensor and removes any cross-coupling of the sensors.

19 Claims, 2 Drawing Sheets

CALIBRATION OF ORTHOGONAL SENSOR SUITE

This application claims priority to U.S. Provisional Application Ser. No. 60/193,637 Filed Mar. 31, 2000.

BACKGROUND OF THE INVENTION

This present invention relates generally to the calibration of sensors and more particularly to the calibration of orthogonal inertial sensors for use in a navigation system.

Some vehicle navigation systems utilize inertial sensors, such as accelerometers, to propagate the position of the vehicle. In particular, some vehicle navigation systems utilize a suite of nominally orthogonal accelerometers to measure acceleration in each direction to propagate the position of the vehicle.

It is difficult to manufacture a sensor suite comprising a plurality of sensors mounted orthogonally (or some other known relative orientation) with high accuracy. After manufacture, the orthogonality of the sensor suite is tested. The sensor suite is mounted to a precisely formed cube. The cube is then placed on a precisely level surface, sequentially on each face of the cube. At each orthogonal orientation of the sensor suite and cube, readings from each of the sensors are taken. If a cross-coupling of the sensors (deviation from perfectly orthogonal) exceeds a predetermined threshold, that sensor suite is discarded. Typical yield rates for sensor suites with orthogonal accelerometers maybe less than ten percent. At the same time, the processes for trying to achieve precise orthogonality of the plurality of sensors is expensive, despite the low yield.

SUMMARY OF THE INVENTION AND ADVANTAGES

The present invention provides the ability to accurately use sensor suites with sensors that are not perfectly arranged in the desired orientation. For example, the present invention permits the use of three accelerometers that are mounted at an orientation at some deviation from mutually orthogonal. The cross-coupling of the sensors is first measured and then utilized to generate a transformation matrix. The transformation matrix is then utilized to correct the signals from the sensors and remove the cross-coupling. The present invention also simultaneously compensates for offsets in each of the sensors in the sensor suite.

As a result, lower cost processes can be used to manufacture the sensor suite, while also obtaining higher accuracy. Further, a higher yield is obtained, since sensor suites that previously would have been discarded can now be utilized, with the corrective transformation matrix.

Preferably, the transformation matrix is stored on the sensor suite in some readable form. In this manner, the sensor suite can be sold separately and subsequently installed into a navigation system (for example). A CPU in the navigation system then reads the transformation matrix that corresponds to that sensor suite and utilizes the transformation matrix to correct the data from the sensor suite.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
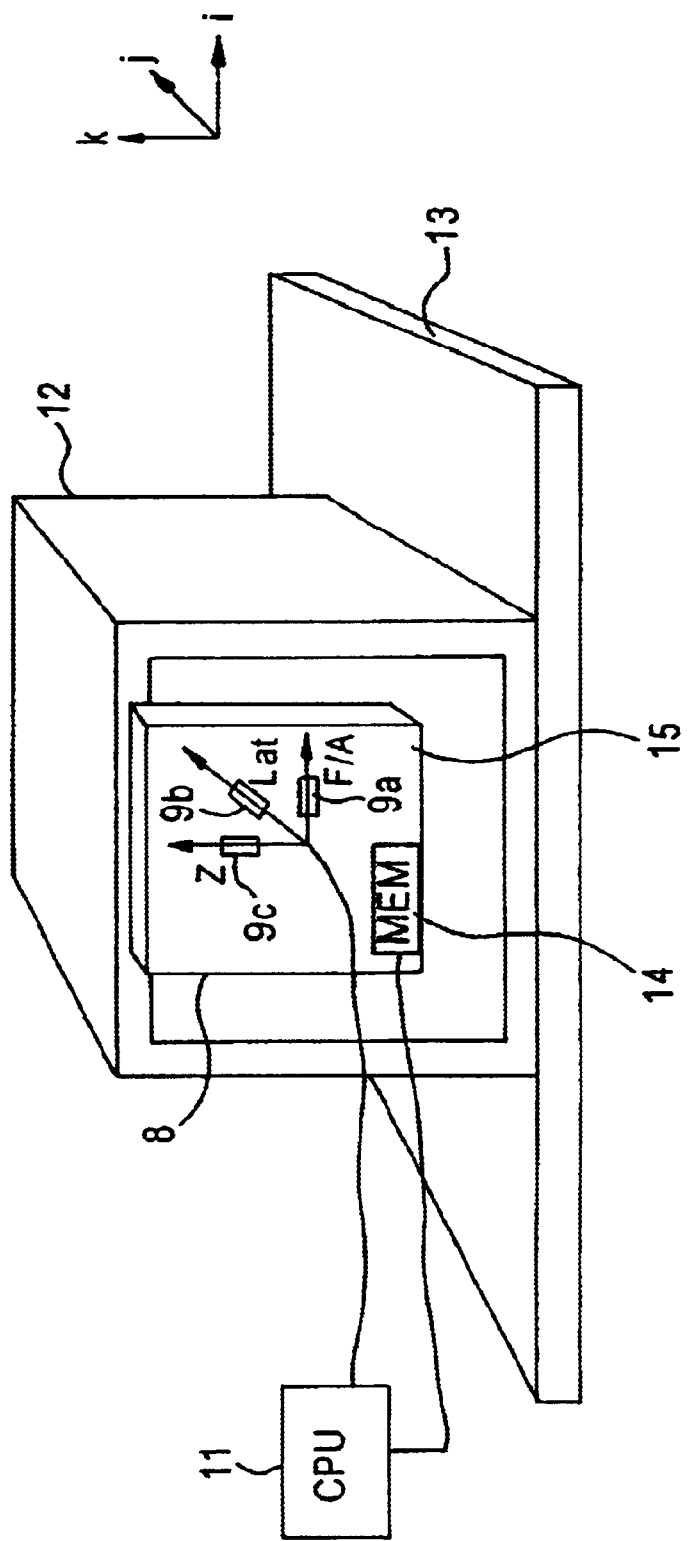
FIG. 1 is a perspective view of inertial sensors mounted to a cube and connected to a CPU.

The present invention provides a method and system for calibrating and using inertial sensors that are nominally fixed at some known orientation relative to each other. This invention will be described by way of example in FIG. 1 with respect to an inertial sensor 8 comprising three orthogonally-mounted accelerometers 9a, b and c, for use in a vehicle navigation system. The calibration system 10 includes a computer 11, which includes a processor, memory, mass storage, display, keyboard and mouse and which is suitably programmed to perform the functions described herein. The calibration system 10 further includes a device for selectively imparting known accelerations as known orientations upon the inertial sensor 8. In this case, this function is performed by an accurately machined steel cube 12 on an accurately leveled Graphite plate 13.

The inertial sensor 8 of the present invention further includes a memory 14, such as EEPROM, RAM or other optical or magnetic memory. The memory 14 is preferably mounted to the same board 15 as the accelerometers 9a–c. Alternatively, the memory 14 may consist of a bar code or some other optically or magnetically readable markings. The preferred embodiment is to use an actual electronic memory such as an EEPROM that is physically located on the board 15 and is electronically accessible to a CPU where it is used.

In the method of the present invention, the inertial sensor 8 is mounted inside the cube 12 in a fixed orientation relative to the cube. The cube 12 is then placed on each of its six sides, while the computer 11 takes reading from each of the accelerometers. There are three accelerometer values that are obtained from each of the six sides of the cube. That results in eighteen numbers. As will be described later, these eighteen numbers (or a subset of them) within the microprocessor of the computer in the system to which the part is interfaced to mathematically correct for gain, offset, and orthogonality errors of the inertial sensor 8. The end result will be a 3×3 matrix which when multiplied by the 3×1 measured data matrix will yield a corrected 3×1 data matrix.

The three individual accelerometers are referred to as:

| | |
|---|---|
| F/A | Fore/Aft |
| Lat | Lateral |
| Z | Up/Down |

The eighteen values obtained by the computer 11 after placing the cube 12 on each side are referred to as follows:

$F/A_{(+i)}$ $F/A_{(-i)}$ $F/A_{(+j)}$ $F/A_{(-j)}$ $F/A_{(+k)}$ $F/A_{(-k)}$ $Lat_{(+i)}$ $Lat_{(-i)}$ $Lat_{(+j)}$ $Lat_{(-j)}$ $Lat_{(+k)}$ $Lat_{(-k)}$ $Z_{(+i)}$ $Z_{(-i)}$ $Z_{(+j)}$ $Z_{(-j)}$ $Z_{(+k)}$ $Z_{(-k)}$

Where (+i), (+j), and (+k) are the directions that correspond to three orthogonal sides of the cube and (−i), (−j), and (−k) are the directions that correspond to opposite three sides respectively. For example, $F/A_{(+i)}$ is the output from the F/A sensor while the block is sitting on the (+i) side of the cube in the presence of gravity.

Regarding offsets, if the cube is placed on any side and all three measurements are taken, and then again on the opposing side, then the average of the two reading for each accelerometer element must equal the offset. Better yet, the average of all six sides for a given sensor must also be equal to the offset. Averaging all six to compute the offset is preferred because it uses more information than averaging two.

The following steps are required to obtain the 3×3 matrix:

1. Compute Offsets:

$$F/A_{OFFSET} = \frac{F/A_{(+i)} + F/A_{(-i)} + F/A_{(+j)} + F/A_{(-j)} + F/A_{(+k)} + F/A_{(-k)}}{6}$$

$$Lat_{OFFSET} = \frac{Lat_{(+i)} + Lat_{(-i)} + Lat_{(+j)} + Lat_{(-j)} + Lat_{(+k)} + Lat_{(-k)}}{6}$$

$$Z_{OFFSET} = \frac{Z_{(+i)} + Z_{(-i)} + Z_{(+j)} + Z_{(-j)} + Z_{(+k)} + Z_{(-k)}}{6}$$

2. Compute Nine Components with Offset Removed:

$$F/A_i = F/A_{(+i)} - F/A_{OFFSET}$$

$$F/A_j = F/A_{(+j)} - F/A_{OFFSET}$$

$$F/A_k = F/A_{(+k)} - F/A_{OFFSET}$$

$$Lat_i = Lat_{(+i)} - Lat_{OFFSET}$$

$$Lat_j = Lat_{(+j)} - Lat_{OFFSET}$$

$$Lat_k = Lat_{(+k)} - Lat_{OFFSET}$$

$$Z_i = Z_{(+i)} - Z_{OFFSET}$$

$$Z_j = Z_{(+j)} - Z_{OFFSET}$$

$$Z_k = Z_{(+k)} - Z_{OFFSET}$$

3. Assemble 3×3 Matrix from Nine Components with Offset Removed:

$$A = \begin{bmatrix} F/A_i & F/A_j & F/A_k \\ Lat_i & Lat_j & Lat_k \\ Z_i & Z_j & Z_k \end{bmatrix}$$

Matrix A represents the undesired transformation that happened to the original data:

Depending Upon Which Side of the Cube $(+i)$ $(-i)$ $(+j)$ $(-j)$ $(+k)$ $(-k)$ $$X_{ORIGINAL} = \begin{bmatrix} 1 \\ 0 \\ 0 \end{bmatrix} OR \begin{bmatrix} 0 \\ 1 \\ 0 \end{bmatrix} OR \begin{bmatrix} 0 \\ 0 \\ 1 \end{bmatrix} OR \begin{bmatrix} -1 \\ 0 \\ 0 \end{bmatrix} OR \begin{bmatrix} 0 \\ -1 \\ 0 \end{bmatrix} OR \begin{bmatrix} 0 \\ 0 \\ -1 \end{bmatrix}$$

In other words:

$$X_{MEASURED-OFFSET} = AX_{ORIGINAL}$$

$$X_{MEASURED-OFFSET} = \begin{bmatrix} F/A \\ Lat \\ Z \end{bmatrix} - \begin{bmatrix} F/A_{OFFSET} \\ Lat_{OFFSET} \\ Z_{OFFSET} \end{bmatrix}$$

(This is the result of imperfect manufacturing)

This A matrix has gain, and cross-coupling (non-orthogonality) information in it.

The original Signal $X_{ORIGINAL}$ can be obtained as follows:

$$X_{ORIGINAL} = A^{-1} X_{MEASURED-OFFSET} \text{ (One 3×3 matrix inversion required to get } A^{-1})$$

This mathematical operation corrects any gain errors and rotates the sensors such that they are alligned with the case of the part and subsequently with the part case, alligned to the cube. The gains are correct and the outputs are orthogonal and referenced to the part body.

Figure 2:
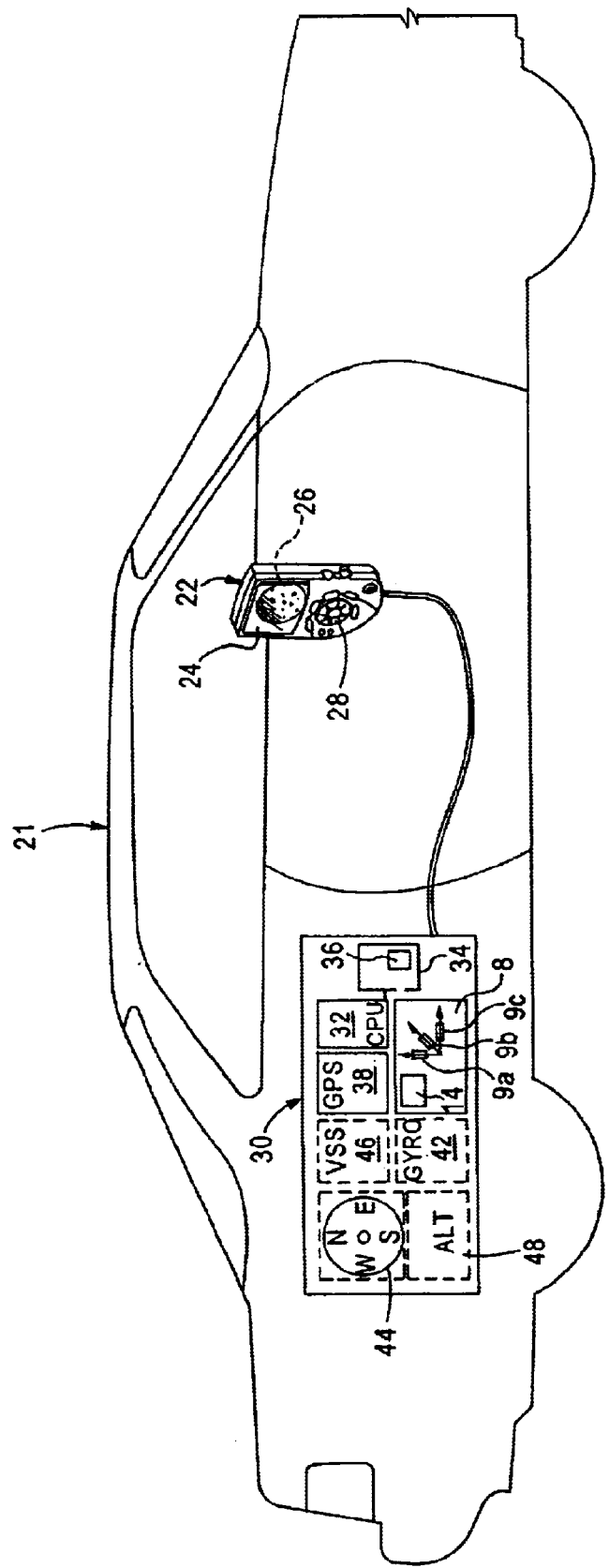
FIG. 2 is a schematic illustrating a calibrated inertial sensor according to the present invention installed on a vehicle.

The transformation matrix $A^{-1}$ is then stored by the computer 11 on memory 14. The calibrated inertial sensor 8 from FIG. 1 is then installed in a navigation system 20 of the present invention, as shown in FIG. 2. FIG. 2 shows the calibrated inertial sensor 8 and navigation system 20 of the present invention installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD-ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and inertial sensor 8. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

Generally, the navigation system 20 propagates the position of the vehicle 21 relative to the map database 36, i.e. relative to road segments and intersections. The navigation system 20 also determines the current location of the vehicle 21 in terms of latitude and longitude. Generally, the CPU 32 and position and motion determining devices determine the position of the vehicle 21 relative to the database 36 of roads utilizing dead reckoning, map matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

In the present invention, the CPU 32 of the navigation system 20 reads transformation matrix $A^{-1}$ from memory 14 and applies it to signals received from the inertial sensor 8 in order to calibrate the orientation of the accelerometers 9a–c relative to each other. The CPU 32 then calibrates the orientation of the inertial sensor 8 relative to the vehicle 21, preferably using the technique described in co-pending application U.S. Ser. No. 09/159,164, Filed Sep. 23, 1998, entitled "Calibration of Multi-Axis Accelerometer in Vehicle Navigation System" the assignee of which is the assignee of the present invention, which is hereby incorporated by reference in its entirety. The CPU 32 then propagates the position of the navigation system 20 based upon signals from the inertial sensor 8 using known techniques or preferably using the technique described in co-pending application U.S. Ser. No. 09/800,609 Filed Mar. 7, 2001, entitled "Propagation of Multiaxis Accelerometer in Vehicle Navigation System" the assignee of which is the assignee of the present invention, which is hereby incorporated by reference in its entirety.

With the transformation matrix A-1 applied, the inertial sensor 8 behaves as a precisely manufactured orthogonal axis accelerometer. This improves the performance of the inertial sensor 8 (and navigation system 20) and reduces the cost of inertial sensor 8, since the manufacturing process will have a higher yield of usable inertial sensors.

Although described above with respect to a three-accelerometer orthogonal axis inertial sensor, the present invention could also be used with other inertial sensors and for orientations other than orthogonal.

Six sensors can be calibrated in a similar manner. The same three-axis accelerometer can be calibrated in conjunction with a three-axis turn rate sensor. Similar rotational excitation (instead of gravity) is required to get the eighteen numbers that represent turn rate performance. The mathematics is the same.

Reference turn rate sensors could be used here for more accuracy. If this is done, the most appropriate method would be to apply sufficient resources to constructing a fixture and reference sensor suite where the exact rotational velocities are always accurately measured. There should be no cross coupling between the reference sensors. If there is no cross-coupling, then rather than 18 numbers, the reference sensor suite will only generate 6 numbers.

Three single-axis accelerometers and three single-axis turn-rate sensors can be simply soldered to a PCB in orientations that are as close as possible to the correct PCB reference frame. The errors can be eliminated by using the above mathematical technique. Here, the PCB can have memory that remembers the 18+18 numbers. The target product microprocessor or DSP can actually be integrated into the calibration process.

An advantage of this technique is that a full strap-down Inertial Measurement Unit (IMU) having reasonable accuracy can be constructed in an inexpensive way that can be made to perform very well.

The key is that the $$\frac{\text{Performance}}{\text{Cost}} \text{ ratio}$$

is greatly improved and the maximum overall performance can also be dramatically increased if an already-existing computer can be easily made to correct sensor problems. A reasonable quality IMU can be made with lesser quality components. Similarly, any array of transducers, antennas, etc. can be characterized with data that aids in the real-time use of the array.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for calibrating a plurality of sensors, each mounted in a fixed orientation relative to the other, the method including the steps of:

a) imparting a plurality of accelerations on the plurality of sensors;

b) measuring motion signals from the sensor resulting from the plurality of accelerations; and c) generating a transformation matrix based upon the motion signals.

2. The method of claim 1 further including the step of: d) storing the transformation matrix.

3. The method of claim 2 wherein said step d) further includes the step of: e) storing the transformation matrix on a sensor suite.

4. The method of claim 1, wherein said step a) further includes the step of impairing a plurality of orthogonal accelerations upon a sensor suite.

5. The method of claim 4 wherein each of the orthogonal accelerations is equal in magnitude.

6. The method of claim 1 wherein the transformation matrix decouples the plurality of sensors.

7. The method of claim 1 further including the step of decoupling the plurality of sensors using the transformation matrix.

8. The method of claim 7 further including the step of computing an offset for each of the plurality of sensors.

9. The method of claim 8 further including the step of subtracting the offsets from each of the motion signals.

10. The method of claim 1 further including the steps of:

d) generating an inverse of the transformation matrix comprising the motion signals minus the offsets.

11. The method of claim 1 further including the steps of:

d) mounting the plurality of sensors to a substrate;

e) storing the transformation matrix on the substrate.

12. The method of claim 11 further including the steps of:

f) connecting a sensor suite to a processor; and g) the processor reading the transformation matrix.

13. An inertial sensor suite comprising:

a) a plurality of generally orthogonally oriented inertial sensors; and b) a computer readable medium storing a transformation matrix, which when utilized by a processor, converts signals from the plurality of inertial sensor into orthogonal motion signals and calibrates said generally oriented inertial sensors using said converted signals.

14. The sensor suite of claim 13 wherein the plurality of inertial sensors are mounted in a fixed orientation relative to one another.

15. The sensor suite of claim 14 wherein the plurality of inertial sensors are mounted on a substrate.

16. The sensor suite of claim 15 further including a memory mounted on the substrate and storing the transformation matrix.

17. The sensor suite of claim 13 wherein the transformation matrix removes offsets from the signals from the plurality of inertial sensors.

18. The sensor suite of claim 13 further including a memory mounted on the a substrate and storing the transformation matrix.

19. An inertial sensor suite comprising:

a) a plurality of generally orthogonally oriented inertial sensors; and b) a computer readable medium storing a transformation matrix, which when utilized by a processor, converts signals from the plurality of inertial sensor into orthogonal motion signals, wherein the transformation matrix removes offsets from the signals from the plurality of inertial sensors.

* * * * *